United States Patent [19]

Toth

[11] Patent Number: 4,566,065
[45] Date of Patent: Jan. 21, 1986

[54] COMPUTER AIDED STENOGRAPHIC SYSTEM

[76] Inventor: Kalman Toth, 24 Jean La., Monsey, N.Y. 10952

[21] Appl. No.: 487,517

[22] Filed: Apr. 22, 1983

[51] Int. Cl.$^4$ ............................................. G06F 1/00
[52] U.S. Cl. .................................................... 364/300
[58] Field of Search ... 364/200 MS File, 900 MS File, 364/300; 178/21; 400/94

[56] References Cited

U.S. PATENT DOCUMENTS

4,041,467 8/1977 Cota et al. ........................... 364/900

Primary Examiner—Raulfe B. Zache
Attorney, Agent, or Firm—Lieberman, Rudolph & Nowak

[57] ABSTRACT

A computer aided stenographic system for rapidly transferring information from a written or spoken form into a typewriter or printed form. The stenographic system consists of software to translate a unique stenographic code into an actual word, or dictionary stored in computer memory for storing words retrievable with the unique stenographic code and additional apparatus to store entered text and transfer the text to a word processing device.

1 Claim, 7 Drawing Figures

COMPUTER AIDED STENOGRAPHIC SYSTEM

FIELD OF THE INVENTION

This invention generally relates to a system for rapidly taking and transcribing dictation and more particularly to a computer aided stenographic system having a computer based dictionary and associated software to translate stenographic codes into typed words. One and two letter codes are used for the most frequently employed words in the language. In addition, the computer based dictionary includes a list of presorted words accessible on the basis of the first two letters and the last letter of the word.

BACKGROUND OF THE INVENTION

The transfer of information from human speech to print is today generally accomplished manually. However, a major disadvantage with this practice is the speed of information transfer. Typically, an executive might dictate to a secretary, either by means of shorthand or a dictating machine. The secretary must then type the information into a typewriter or word processing system, at speeds that rarely exceed 100 words per minute.

It is known that a substantial amount of time and effort in preparing letters or similar documents could be saved if typing certain commonly used words, syllables or symbols having a plurality of characters, could be initiated automatically when encountered during the normal typing functions. Included among the words and syllables coming within this category are "and" "the" "ing", as well as other words and syllables having a greater or lesser number of characters. See, for example, U.S. Pat. Nos. 3,289,804 and 3,617,722.

It is also known to record information encoded by a keyboard on a magnetic tape and later use such information to command a computer controlled machine. See, for example, U.S. Pat. No. 3,530,239.

Further, the use of a single key to represent a word or group of characters can either be done mechanically (by hardware) or through use of a suitably programmed general purpose digital computer (by software). See, for example, U.S. Pat. Nos. 2,717,666; 3,530,239; and 4,068,089.

However, none of the known prior art provides a convenient and easily usable system for rapidly stenographically transcribing and entering into a word processing system both a large number of frequently used words with a minimum number of key strokes, and a still larger number of somewhat less common but normally occurring words. Further, no system currently exists to make one, two or three keyboard entry codes easily learned and easily remembered and thus "user friendly", in combination with the use of a larger number of additional codes or keyboard abbreviations.

It is, therefore, a general object of the present invention to provide a computer aided stenographic system overcoming the known problems in the prior art.

It is a further object of the present invention to provide a computer aided stenographic system which permits the most frequently used words of the language to be entered or coded by use of a single key.

It is a still further object of the present invention to provide a second level of frequently used words which can be entered or coded through use of merely two key strokes, sometimes referred to herein as two letter codes.

It is another object of the present invention to provide a computer aided stenographic system with an "x" code series of up to 26 suffixes such that for instance a coding "xl" would transfer information meaning the suffix "ly" and coding "xi" would input the suffix "ing" etc.

It is a further object of the present invention to provide a computer based stenographic system having a "y" code series of 26 or 36 frequently used words such that for instance "ya" would represent the word "was" and "yw" could represent "would".

It is a still further object of the present invention to provide a computer aided stenographic system having a "z" code series which can provide up to 26 or 36 user defined words, such that for a lawyer "xp" would be plaintiff, "xd" could be defendant, "xl" could be complaint, "x9" could be judgment, etc.

It is another object of the present invention to provide a computer aided stenographic system with a dictionary which consists of a list of words sorted according to the first two letters and last letter of the word. If there are two or more words in the dictionary having the same first two and last letter they would be, in the terminology of this invention a "collision". In such cases, software displays the words in the collision with a number displayed next to each word. The user then quickly and easily selects the correct word, with the correct spelling, by simply pressing the appropriate numeric key.

It is a further object of the present invention to provide a computer aided stenographic system whereby the most frequently used words in the language could be typed in one keystroke, the next most frequent category by two keystrokes, and the majority of words by three key strokes if there is no "collision", and with four or five keystrokes if there is a collision.

It is a still further object of the present invention to provide a dictionary which can be specialized for normal business correspondence, for lawyers, for doctors, or other specialized users.

It is another object of the present invention to have a dictionary of reasonably optimum size so as to contain the words needed for particular useage, but not be so large as to create an unduly high number of collisions which slow down the ultimate production of a finished piece of text.

It is a further object of the present invention to have a computer aided stenographic system, which allows the user to switch between stenographic modes, with special codes, and a conventional typewriter mode whereby a word can be typed in full.

SUMMARY OF THE INVENTION

In accordance with the invention, a computer aided stenographic system is provided having three major components: software to translate the stenographic code into an actual word; a dictionary stored in computer memory; and software to store the entered word and transfer it to a word processor.

The dictionary consists of several components, arranged in a hierarchy of most frequently used words. Most frequently used words in the language are assigned to numeric keys zero through nine. For example "the" is assigned to key four. Such words are defined as "key attached words".

Other frequently used words which do not fit in the key attached word category are assigned two letter codes. For the two letter codes, the initial letters x, y and z are reserved for special purposes. The "x" series provides up to 26 (or 36) suffixes, the "y" series provides 26 (or 36) of the words most frequently used immediately following the key attached word list, and the "z" series can provide up to 26 or 36 user defined words of particular importance, frequency or utility in the user's specialized field.

Finally, the dictionary also contains a list of words sorted according to the first two letters and last letter of the word.

In the stenographic process of the instant invention, the user has only to press a single key for the "key attached words" and the appropriate word appears automatically on the computer screen. For the two letter codes, the word appears after the entry of the two letters. For dictionary words, the first two letters and the last letter must be entered. If there is a unique word in the dictionary, then that word will appear. If not, there will be a "collison" and the software will show all the words in the collison (subject to display space) showing a number before each word. The user responds by pressing the appropriate numeric key. In all cases, correct spelling is automatically provided.

It is a further feature of the instant invention that the most frequently used words in the language can thus be typed in one keystroke, those of lesser frequency by two keystrokes and the majority by three keystrokes if there is no collision and four or five keystrokes if there is a collision.

It is another feature of the instant invention that spaces are automatically inserted to save a large number of key strokes. The use of the numeric keys automatically indicates to the software that the user is entering a key attached word or a one letter code. The use of the initial letters x, y or z automatically indicates to the software that the user is entering a two letter code, and the use of any other letter will activate the dictionary search and cause the device to receive a third letter, and if necessary a collision conflict number.

These and other objects and features of the invention will become apparent from the following more particular description of a preferred embodiment of the invention which is illustrated in the accompanying drawings, wherein.

DESCRIPTION OF THE PREFERRED EMBODIMENT

Figure 1:
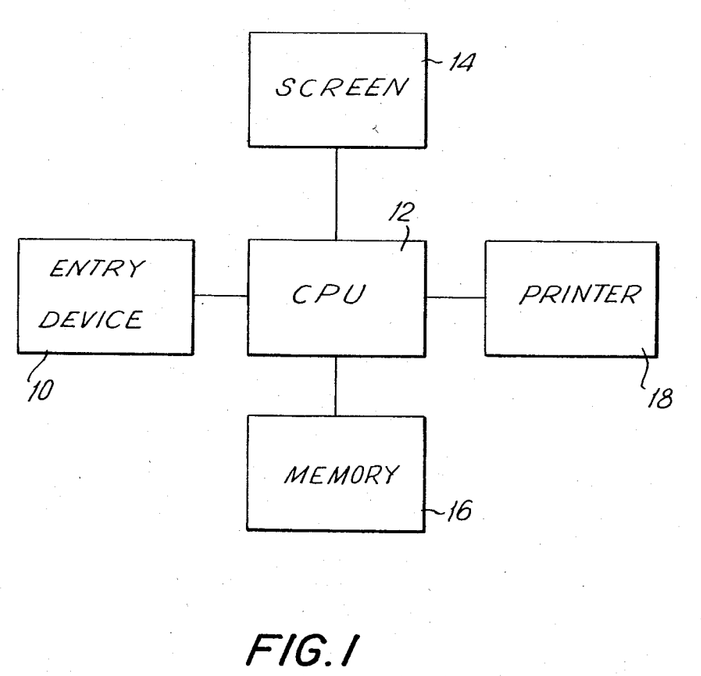
FIG. 1 is a block diagram of the system of the invention.

FIG. 1 illustrates a block diagram of the system which includes entry device 10, attached to general purpose digital computer or central processing unit ("CPU"), 12.

CPU 12 is in turn connected to display screen 14, memory 16, containing the dictionary, and an optional printer 18.

It is to be understood that entry device could be a keyboard if direct entry of information into CPU 12 is desirable. Alternatively, entry device 10 could be a typecoder such that a secretary could take dictation in accordance with this invention at a remote location and then enter the encoded information into the CPU for transcription and necessary editing.

It is to be further understood that the figures discussed herein illustrating software flow charts are descriptive of the manner in which the software accomplished its intended function and that a software programmer skilled in this area would utilize the flow charts to generate appropriate source codes. Similarly, the hardware shown in FIG. 1 would be chosen to accomplish the functions described and various types and models of hardware are applicable to practice of the instant invention. For example, the entire system shown in FIG. 1 could be contained in a Radio Shack Model 100 computer or an EPSON HX20 computer.

Figure 2A:
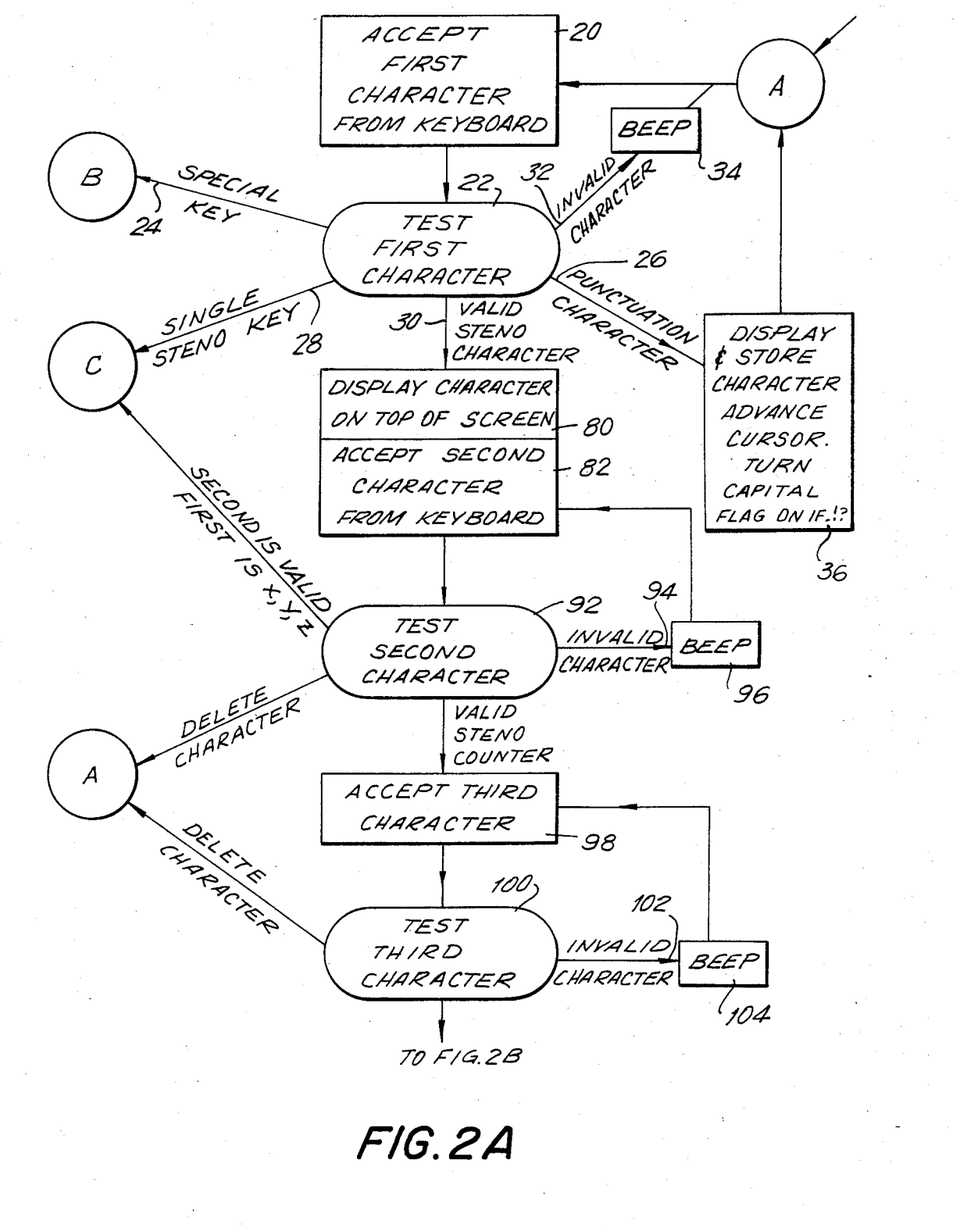
FIGS. 2a and 2b are a flow chart of the "stenographic code handling" portion of the system.

Referring now to FIG. 2, the first step in the inventive process is for the CPU 12 to accept from entry device 10 a first character, illustrated at step 20. This character is then tested by the program at step 22.

The test first character step, 22, can have several results; for example identification of special character 24; punctuation character 26; single steno character 28 (i.e. one of the numeric keys 0 through 9); a "valid" character 30 (any alphabetical character); or an invalid character 32. Entry of an invalid character will cause a beep 34 to alert the user to the problem.

Before considering the total stenographic process from single character or other valid characters, it is useful to first describe the workings of the system when a special character or punctuation character is entered.

A punctuation character such as the period, exclamation mark or question mark will both cause that punctuation character to be displayed on the screen, step 36 and also turn on the capital flag, i.e. make the next word start with a capital. The appropriate spacing is also entered so that the end of the sentence and the beginning of the next sentence do not require any additional time or keyboarding by the user. In detail, after the test first character step 22, if the character consists of punctuation character 36, this causes a display on the screen, the advance of the cursor and the turning on of the capital flag. After these steps are completed, the program will return, by the common return point "A" to step 22.

If a first character test shows a special character 24, the program (see FIG. 4) will go to the series of steps prepared to handle that type of character. The special key handling portion of the invention includes approximately nine different keys or functions. First, there is the steno mode switch key 44 which can cause the keyboard to respond to either the steno or non-steno mode. In the non-steno mode the keyboard will respond as an ordinary typewriter allowing the input of words not contained within the special steno table and/or the dictionary.

Figure 4:
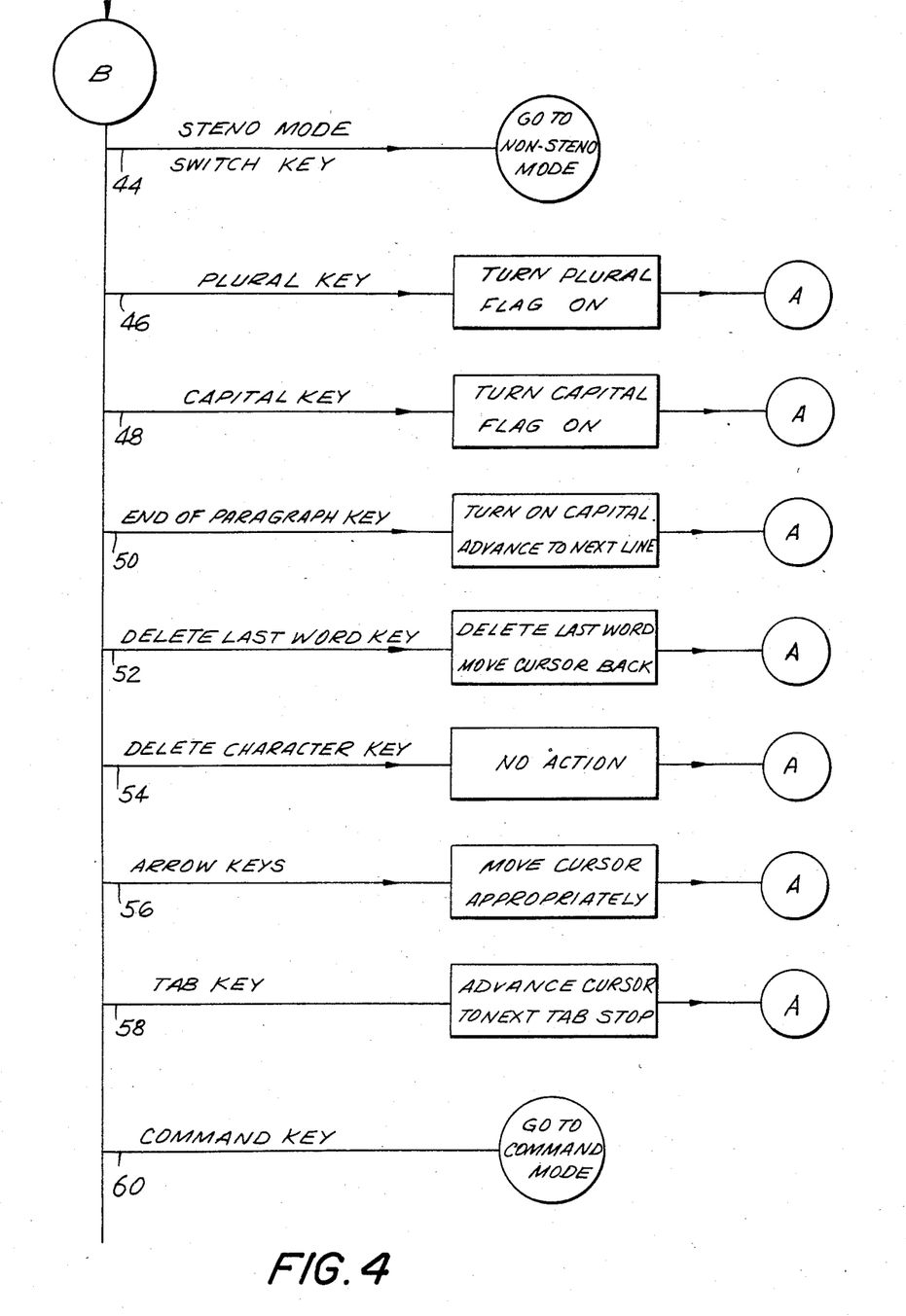
FIG. 4 is a flow chart of the "special key handling" portion of the system.

If the first letter code is a capital letter, then the invention will produce a plural form. Thus, the upper case key acts as a plural key, turning the plural flag on and allowing the device of the instant invention to create the plural form of the inputted word following the normal rules of English grammar. "Plural Key" command 46 after activation, returns via the "A" return bus to step 20.

If the second letter is capitalized, this activates "capital key" command 48 which, like punctuation step 26, will cause the word to be capitalized. On some computers it may be advantageous to designate function keys to perform as plural and capital key. The decision is based on the layout of the keyboard.

The "end of paragraph key" command 50 will both turn on the capital flag and advance the cursor to the next line.

The "delete last word key" command 52 will automatically delete the last word entered and move the cursor back ready to receive the next word, with, as usual, an automatic space between the words. Consistent with the inventions general theme of reducing key stroke, it requires only one key press to delete the last word.

The "delete character key" command 54 will erase the last stenographic code entered at that point, allowing rapid and simple user corrections.

The arrow key command 56 moves the cursor in the appropriate direction, up, down, backspace, or forward, to allow greater power for text editing.

The tab key command 58 simply advances the cursor to the next tab stop.

Figure 6:
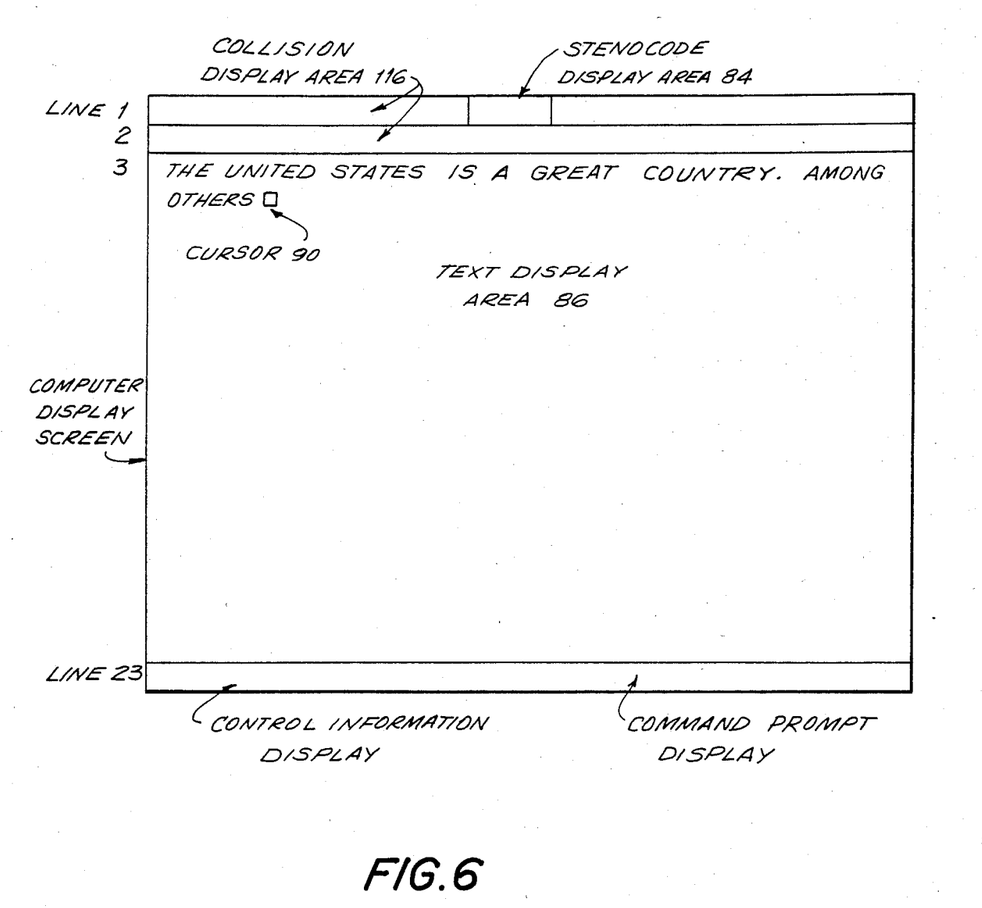
FIG. 6 is a drawing of a sample screen as displayed to the user.

The command key 60 transfers the device to the command mode. As can be seen in FIG. 6, the command mode produces a display on the bottom line, or line 23, of the computer terminal display, and is an interface with a general word processing system apart from the instant invention. This would include such commands as "insert", "delete", "quit", "go to", or "find" and other such word processing or text editing functions. Obviously, it is advantageous after the initial input by use of the stenographic system of the instant invention to be able to manipulate the text in accordance with conventional word processing programs with a minimum of user commands and trouble.

Most of the special key handling functions i.e. numbers 46-58 return, after their use, through block A to accept first character step 20.

It is now appropriate to discuss the handling of a single stenographic key by the system of the instant invention. If a numeric key, zero through nine is pressed, indicating a "key attached word," the system would immediately retrieve the word by moving, via block "c" to the word handling routine shown in FIG. 5. At this point the system would check whether the capital flag was on or off at step 66. If the capital flag is on the first letter would automatically be changed to a capital at step 68. In any event the system would then check whether the plural flag was on, at step 70, and if so form a plural of the word, at step 72.

Figure 5:
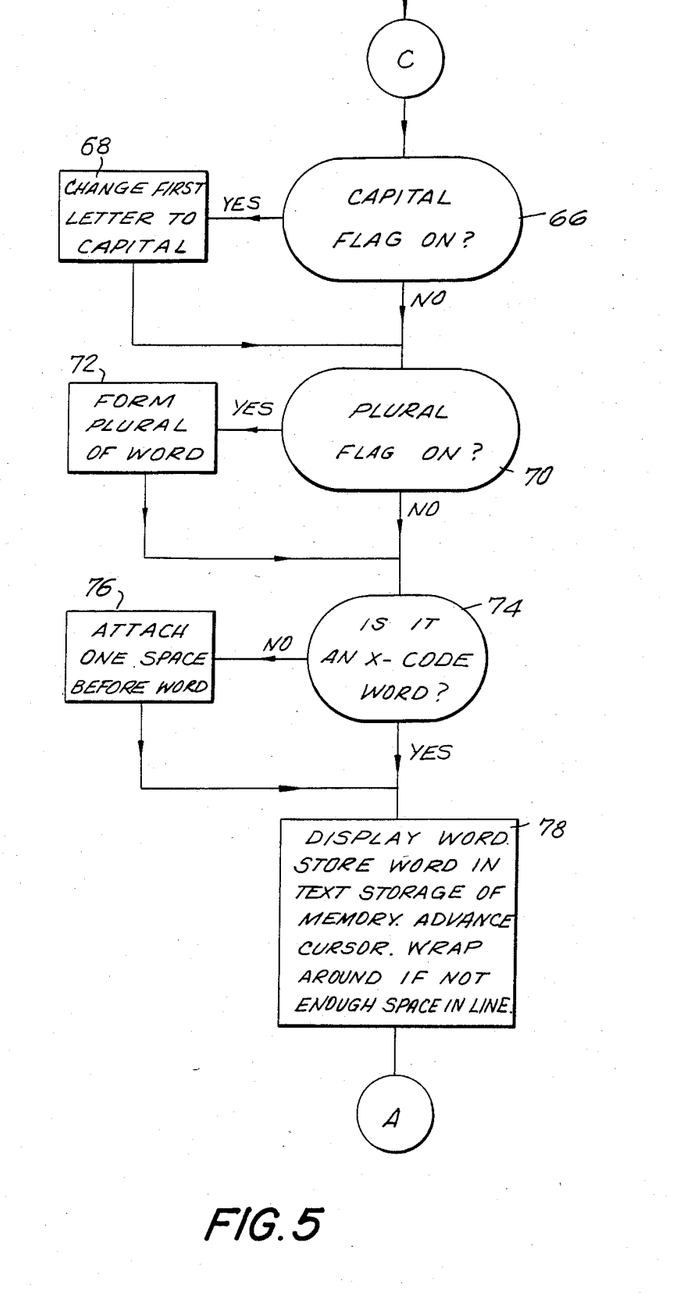
FIG. 5 is a flow chart of the "word handling" portion of the system.

Next, the system would check, at step 74, if the word was an "x" coded word, which in the case of a "key attached word", or "single numeric key", would, of course, test no at step 76.

In either event, the system would then display the word as well as storing the word in the text storage memory. In addition, at step 78, the system would advance the cursor with a wrap around if there is not enough space on the line. By performing all these functions automatically, and without the need for any further user input, greater speed, accuracy and ease of use are made available.

Referring again to FIG. 2, if a valid stenographic character apart from the "key attached words" is inputted, there is a similar series of steps. The character is displayed at the top of the screen at step 80, and the system prepares to accept a second character from the entry device at step 82. The reader should understand the distinction between displaying a character at the top of the screen and the display of the word in the main body of the screen. This will be further clarified by reference to FIG. 6 which is a sample screen.

At the center of line one of the screen, the stenographic code display area shows the user the actual key stroke entered. In the text display area, lines 3-22, the text as decoded by the invention is displayed for the user along with a cursor under the user's control by use of the arrow keys command key 56. The text display area 86 thus includes text 88 and a cursor 90.

Returning to a description at FIG. 1 of the handling of the valid stenographic characters, a second character would be accepted from the keyboard at step 82 and tested at step 92. Again, this character might be invalid causing the software to follow path 94, which would cause a beep at step 96 and a return to "accept second character" step 82, allowing the user to correct his error.

Alternatively, the second character might be a special key such as a delete character command at which point the system would allow the user to correct his errors by returning via point "A" to the "accept first character" step 20.

Further, if the second character is valid and the first character was x, y or z, the system would go via point "c" to the word handling routine previously described in connection with the "key attached words".

If the first character is other than an x, y and z, and the second character is a valid stenographic character, the system would be prepared to accept a third character at step 98. The third character would be tested at step 100, and if invalid the software would follow path 102 to cause a beep at step 104 and a return to the "accept third character" step at 98.

Again, the third character might be a "delete character" allowing the correction of errors by returning to the "accept first character" step 20.

Figure 2B:
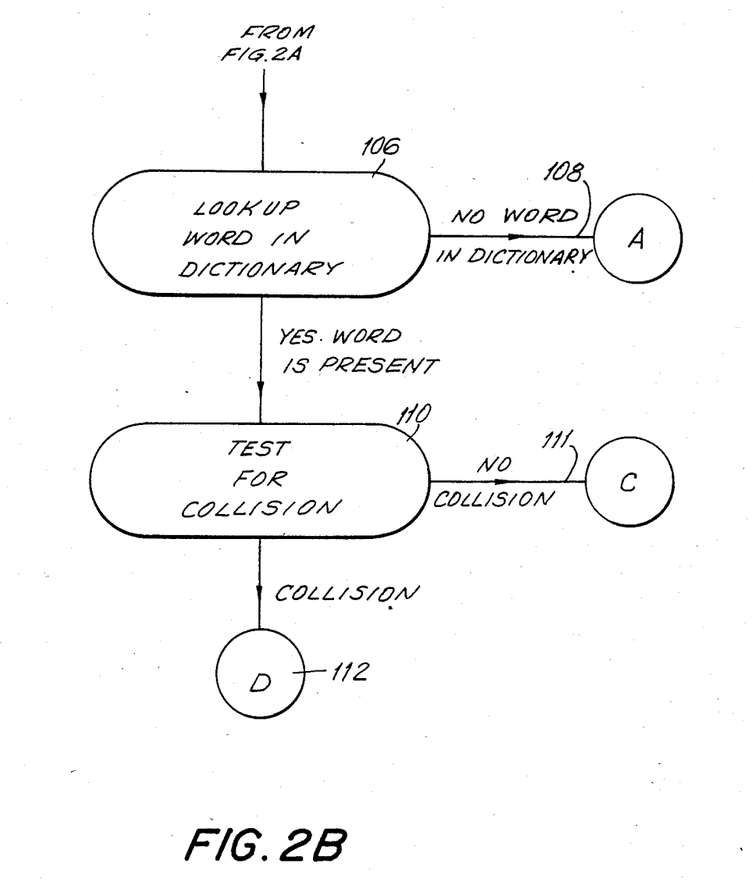

Referring now to FIG. 2B, once three valid characters have been entered, the system would then, at step 106, look up the word in the memory dictionary. If there is no such word in the dictionary, it would be necessary to return to the "accept first character" step via path 108 to attempt to reenter the information. If there is a word present in the dictionary, the next step, 110, would be to test for a "collision" i.e. two or more words in the dictionary with the same first two and last letters, requiring user resolution as to which of the various words was to be used. If there is no collision, the system would move, via path 111, to the word handling routines described above and illustrated in FIG. 5. If there is a collision, the system would move via path 112 to handle the collision.

Figure 3:
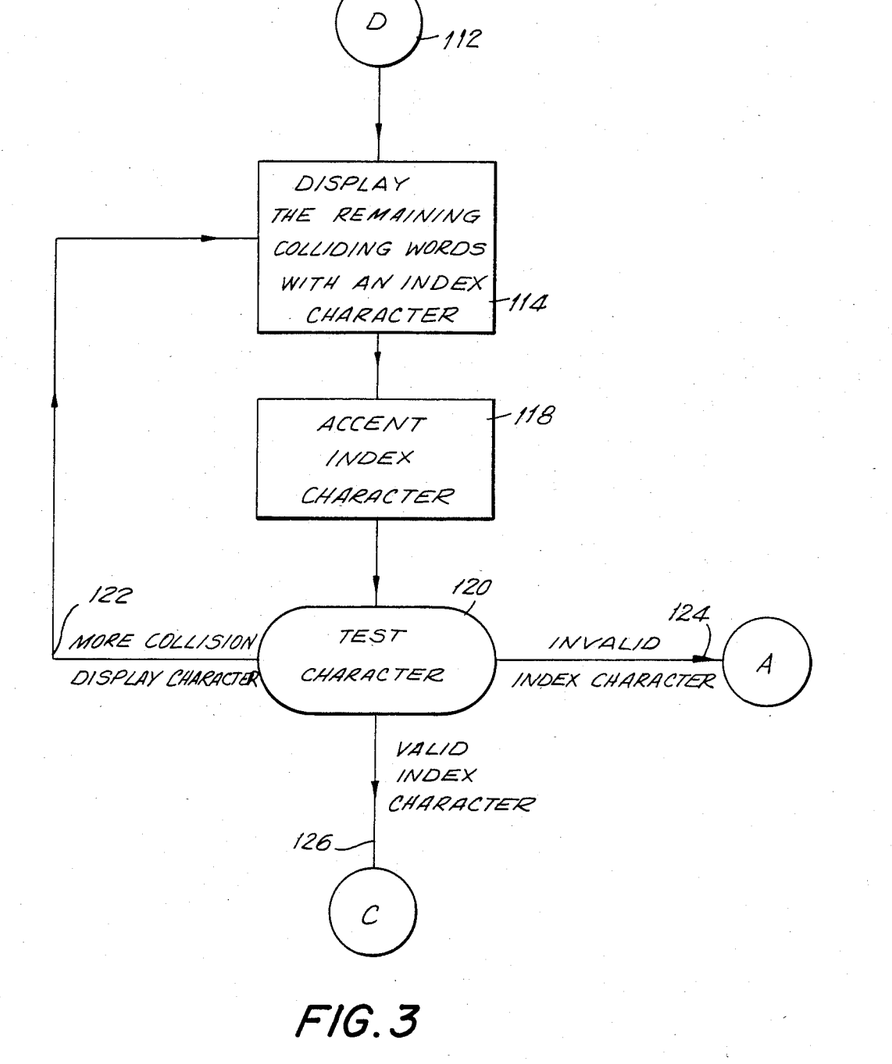
FIG. 3 is a flow chart of the "collision handling" portion of the system.

Referring now to FIG. 3, the collision handling routine allows the display of the first nine colliding words along with an index character, i.e. the reference numerals 0-9. This step 114, if it involves 9 or less colliding words, will display the words, and the associated reference numerals 1-9 in the collision display area, lines 1-2 of the display terminal, illustrated in FIG. 6, at 116. If there are more than 9 collision words, the end of line 2 will indicate an error and the reference numeral 0. The user would then input an index character which would be accepted by the system, at step 118. After accepting the character the system would, test it at step 120.

If the character is zero, this would indicate that there are more collision words to be displayed as the first nine did not contain the word desired. Thus the system would branch, via path 122, back to the display and display the next group of up to nine words and so on as necessary. If an invalid index character is detected, i.e. something other than the numerals 0–9, the system would return, via path 124 to accepting the first character. Finally, if a valid index character 1–9 was displayed, the system would move to the word handling routine via path 126, previously illustrated and shown in FIG. 5.

On some computers, where the whole screen can be refreshed in less then 1 second, it is advantageious to erase the screen all together and use it fully for collision display. On such a system the collision index will go 1 to g and A to Z. Once the selection is done, the original display is restored quickly. If there are more than 35 colliding words than the above routine is used to display the remainder.

In operation, a user of the instant invention would rapidly learn the various collision reference numerals and immediately enter them as a desired word is dictated. It has been found that the typical user becomes familiar with the large majority of such collision words within about a month of useage, thus eliminating the need to refer to the screen and scan it for the correct term. However, the system is accessible to novices as well, by use of the display and the numeric term zero which allows display of further terms if necessary.

The system can be easily understood in reference to a simple example, the entry of text "The United States of America is a great Country." The steno user would type the number "4" which would automatically enter the word "The" with a space. The entire phrase United States of America can be stored in the dictionary and would be coded as "una", i.e. the first two and the last letter of the phrase. Similar phrases for specialized use in law, business, accounting, medicine, etc. could be similarly stored in the system dictionary. A phrase such as "Supreme Court of the United States" could be entered by a single phrase sus and so forth.

Returning to the example, the space after the phrase United States of America would automatically be inserted by the system, and the user would input the number "9" followed the number "3" giving the words "is" and "a" with the appropriate spacing. Next, the user would type "gr" and "t" followed by a collision index number such as "2" if there were a collision from the entry of the first two and last letters alone. Similarly, the keystrokes "coy2" would enter "country." The total number of t strokes saved, and the amount of time thus saved is clearly extremely significant with the use of the instant invention.

The second benefit is that the word is always correctly spelled. In fast typing, letters can be transposed even in simple words like "the". Many words like "knowledgable" are frequently misspelled and the total document preparation time increases significantly. The foregoing disclosure and description of the invention is illustrative and explanatory thereof and various changes in the size, shape and materials, as well as in the details of the illustrated construction may be made within the scope of the appended claims without departing from the spirit of the invention.

I claim:

1. A method for rapidly transferring information from a written or spoken form into a typewriter or printed form comprising the steps of:

assigning a first numeric code to a predetermined first group of frequently used words, assigning a two letter code to a predetermined second group of frequently used words, identifying a predetermined third group of words by the first two letters and the last letter of a particular word within said third group of words, providing a second numeric code to identify words within said third group of words having the same first two and last letters, and entering into an appropriately programmed data processing system a combination of said first numeric code, said two letter code, said first two and last letters of a desired word, and said second numeric code to produce information in a typed or printed form.

* * * * *